United States Patent [19]
Hupfl

[11] Patent Number: 5,542,210
[45] Date of Patent: Aug. 6, 1996

[54] APPARATUS FOR SUPPORTING PLANTLIFE GROWING IN A GROUND AREA

[76] Inventor: Martin Hupfl, 334 Gordon Rd., Robbinsville, N.J. 08691

[21] Appl. No.: 497,734

[22] Filed: Jul. 3, 1995

[51] Int. Cl.⁶ ................................................. A01G 17/06
[52] U.S. Cl. ................................................. 47/47; 47/44
[58] Field of Search .................................. 47/47 R, 47 L, 47/47 S, 44 L, 43 R, 42 R

[56] References Cited

U.S. PATENT DOCUMENTS

| | | |
|---|---|---|
| 1,162,176 | 11/1915 | Lewis . |
| 1,627,495 | 5/1927 | Effley . |
| 1,718,971 | 7/1929 | Mueller . |
| 1,758,839 | 5/1930 | Kelsey . |
| 1,898,164 | 2/1933 | Bauer . |
| 2,000,911 | 5/1935 | Balousek . |
| 2,152,018 | 3/1939 | Barnhart ........................ 47/47 L |
| 2,296,217 | 9/1942 | Maloney . |
| 2,764,846 | 10/1956 | Worthington . |
| 2,809,468 | 10/1957 | Eliot . |
| 2,817,190 | 12/1957 | Matson . |
| 2,835,017 | 5/1958 | Hoerr . |
| 2,851,823 | 9/1958 | Peterson . |
| 2,862,334 | 12/1958 | Sandvig . |
| 3,061,976 | 11/1962 | Carroll et al. . |
| 3,302,328 | 2/1967 | King . |
| 3,324,592 | 6/1967 | Prenner et al. . |
| 4,222,198 | 9/1980 | Napolitano et al. . |
| 4,318,246 | 3/1982 | Jungbluth et al. . |
| 4,329,762 | 5/1982 | Maidhof . |
| 4,519,162 | 5/1985 | Stuckey . |
| 4,649,666 | 3/1987 | Ness et al. . |
| 4,870,781 | 10/1989 | Jones . |
| 5,129,179 | 7/1992 | Kronmiller ........................ 47/44 L |
| 5,159,780 | 11/1992 | Molthen ........................ 47/43 R |
| 5,199,214 | 4/1993 | Caldwell . |

FOREIGN PATENT DOCUMENTS 14815  6/1912  United Kingdom .................... 47/475

*Primary Examiner*—Henry E. Raduazo
*Attorney, Agent, or Firm*—Sperry, Zoda & Kane

[57] ABSTRACT

An apparatus,for supporting various different types of plantlife growing in a ground area including stakes adapted to be inserted into the ground with preferably a pointed end formed of hard plastic preferably recycled. The one or more stakes define a slot extending therethrough adapted to receive a supporting strap of hard or preferably recycled plastic. The supporting strap includes a flat surface adapted to support the shaft of a vertically growing plant or tree without damaging thereto. The strap is preferably generally rectangular in cross section and includes a plurality of studs thereon and defines a plurality of apertures therein. The studs are adapted to extend through the apertures to form the supporting strap into circular formations of varying lengths for supporting of plantlife growing adjacent to the stake. The supporting strap is designed to extend through the preferably rectangular slots in the stakes to facilitate support. A tubular locking device is included for extending about the studs at the location where they are locked with respect to the apertures to facilitate maintaining of retainment therebetween. The tubular locking device preferably extends about the supporting strap and is movable longitudinally thereal-ong.

20 Claims, 2 Drawing Sheets

APPARATUS FOR SUPPORTING PLANTLIFE GROWING IN A GROUND AREA

BACKGROUND OF THE INVENTION

1. Field of the Invention

The present invention pertains to the field of devices for supporting growing plantlife. Various types of means have been devised previously for supporting plantlife such as hangers, trellises, retaining wires and stakes, etc. The present invention provides a novel apparatus including a unique stake used in combination with a novelly configured supporting strap and a new tubular locking device. Prior art devices normally utilize wood or other standard material stakes which are pounded into the ground and are a very short length such that wires extend vertically upwardly and outwardly therefrom for supporting of trees or other plants. The present device, however, provides a means for supporting any type of tree, tomato plant, shrub or other plantlife as desired by the user. The present device also provides a means for utilizing recycled hard plastic in forming these parts such that the apparatus is usable for many years.

2. Description of the Prior Art

Prior art devices have been designed for achieving support of various types of plantlife such as shown in U.S. Pat. No. 1,162,176 issued Nov. 30, 1915 to R. C. Lewis on a "Flower Holder"; and U.S. Pat. No. 1,627,495 issued May 3, 1927 to M. P. Effley on a "Bush Or Plant Support"; and U.S. Pat. No. 1,718,971 issued Jul. 2, 1929 to A. Mueller on a "Device For Supporting Branches Of Trees"; and U.S. Pat. No. 1,758,839 issued May 13, 1930 to T. Kelsey on a "Plant Support"; and U.S. Pat. No. 1,898,164 issued Feb. 21, 1933 to J. Bauer on a "Plant Support"; and U.S. Pat. No. 2,000,911 issued May 14, 1935 to W. Balousek and assigned to W. J. Dennis & Company on a "Plant Support"; and U.S. Pat. No. 2,296,217 issued Sep. 15, 1942 to J. Maloney on a "Christmas Tree Anchor"; and U.S. Pat. No. 2,764,846 issued Oct. 2, 1956 to J. Worthington on a "Plant Support"; and U.S. Pat. No. 2,809,468 issued Oct. 15, 1957 to S. Eliot and assigned to Crest Specialty on a "Combination Plant Prop And Feeder"; and U.S. Pat. No. 2,817,190 issued Dec. 24, 1957 to F. Matson on a "Plant Support"; and U.S. Pat. No. 2,835,017 issued May 20, 1958 to B. Hoerr and assigned to C. & H. Specialties Co. on a "Nail Stake"; and U.S. Pat. No. 2,851,823 issued Sep. 16, 1958 on a "Adjustable Plant Support"; and U.S. Pat. No. 2,862,334 issued Dec. 2, 1958 to T. Sandvig on a "Plant, Vine Or Tree Holder"; and U.S. Pat. No. 3,061,976 issued Nov. 6, 1962 to J. Carroll et al on a "Plant Support"; and U.S. Pat. No. 3,302,328 issued Feb. 7, 1967 to W. King on a "Plant Support"; and U.S. Pat. No. 3,324,592 issued Jun. 13, 1967 to L. Prenner et al on a "Plant Support"; and U.S. Pat. No. 4,222,198 issued Sep. 16, 1980 to A. Napolitano et al on a "Tree Tie"; and U.S. Pat. No. 4,318,246 issued Mar. 9, 1982 to E. Jungbluth et al on a "Means For Securing A Tree To Ground Stakes"; and U.S. Pat. No. 4,329,762 issued May 18, 1982 to G. Maidhof and assigned to Maidhof GmbH on a "Clamp Connector For Vines"; and U.S. Pat. No. 4,519,162 issued May 28, 1985 to W. Stuckey on a "Vertical Plant Support With Horizontal Hoops"; and U.S. Pat. No. 4,649,666 issued Mar. 17, 1987 to E. Ness et al on "Self-Stabilizing Tree Support Assemblies"; and U.S. Pat. No. 4,870,781 issued Oct. 3, 1989 to T. Jones on a "Combination Tree Support And Feeder Stake"; and U.S. Pat. No. 5,199,214 issued Apr. 6, 1993 to E. Caldwell and assigned to Dalen Products, Inc. on a "Tree Staking System, Parts Therefor And Methods Of Making The Same".

SUMMARY OF THE INVENTION

The present invention provides an apparatus for supporting plantlife growing in a ground area which includes a stake which has two ends. The top end of the stake is of any conventional shape whereas the bottom end provides an insertion end which is spatially disposed from the top end. This insertion end preferably includes an insertion point for allowing the stake means to be fixedly secured extending into the ground area adjacent to the plantlife in a position to extend upwardly out of the ground area to facilitate supporting of the plantlife. The stake preferably also defines a plurality of slots therein extending generally laterally therethrough. Preferably each stake will include three or four such individual slots. The stake is also preferably made of a hard plastic which is preferably recycled and also each stake is preferably of a size of approximately four to six feet in length.

A supporting strap is included which has a first flat surface thereon adapted to abut an adjacent plantlife for supporting thereof. Preferably this supporting strap further includes a second flat surface area oppositely positioned thereon from the first flat surface. The first flat surface area of the support strap is oriented generally perpendicularly with respect to the ground area to minimize damaging of the plantlife abutting thereagainst for support. The supporting strap is preferably made of a hard plastic which may be recycled. This supporting strap further includes a plurality of apertures extending therethrough. The supporting strap is designed to extend through the slots defined in the stake for securing of plantlife with respect thereto.

The supporting strap further includes a plurality of studs extending outwardly therefrom and positioned thereon. These studs are each individually engageable in a position extending through at least one of the apertures to detachably affix the supporting strap into a circular loop shape in surrounding supporting engagement with respect to the adjacent plantlife for supporting thereof. The studs each include preferably an enlarged head area thereon which is designed to facilitate detachable securement of each of the stud means with respect to each of the aperture means.

A tubular locking device is included preferably also of hard plastic preferably recycled. The tubular locking means is positioned extending around the supporting strap and is slidably movable therealong. This tubular locking device is movable to a locked position in surrounding engagement with respect to the stud which is in engagement with one of the apertures. To facilitate detachable securement therebetween the tubular locking means may also be movable to a plantlife engaging position surrounding the supporting strap in the area thereof in abutment with respect to the supporting plantlife in order to minimize the possibility of damaging thereto during installation or thereafter while the plantlife is growing.

It is an object of the present invention to provide an apparatus for supporting plantlife growing in a ground area wherein initial costs for supporting equipment is minimized.

It is an object of the present invention to provide an apparatus for supporting plantlife growing in a ground area wherein maintenance cost is minimized.

It is an object of the present invention to provide an apparatus for supporting plantlife growing in a ground area wherein all parts are made from hard plastic to prevent rusting or other deterioration thereof.

It is an object of the present invention to provide an apparatus for supporting plantlife growing in a ground area wherein all parts can be made from recycled plastic.

It is an object of the present invention to provide an apparatus for supporting plantlife growing in a ground area wherein a single apparatus can be usable for supporting multiple different types of plantlife such as trees, shrubs, tomato plants, etc.

It is an object of the present invention to provide an apparatus for supporting plantlife growing in a ground area wherein the same apparatus can be used year after year in different applications.

It is an object of the present invention to provide an apparatus for supporting plantlife growing in a ground area wherein damage to the growing plantlife is minimized.

It is an object of the, present invention to provide an apparatus for supporting plantlife growing in a ground area wherein use with new growing trees is particularly advantageous.

It is an object of the present invention to provide an apparatus for supporting plantlife growing in a ground area wherein a single supporting strap of a given length can be used in various secured lengths.

It is an object of the present invention to provide an apparatus for supporting plantlife growing in a ground area wherein the tubular locking means can be used to enhance the locking characteristics of the supporting strap.

It is an object of the present invention to provide an apparatus for supporting plantlife growing in a ground area wherein the tubular locking device can be movable to a position to further minimize damage to the growing plantlife.

It is an object of the present invention to provide an apparatus for supporting plantlife growing in a ground area wherein the supporting strap is generally rectangular in cross section and the slots extending through the stake are generally rectangular in cross section and are adapted to receive the supporting strap extending therethrough and maintaining the supporting strap in a vertical orientation with the flat surface area thereof extending generally perpendicular to the surrounding ground to further minimize damaging to growing plantlife supported thereby.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 3:
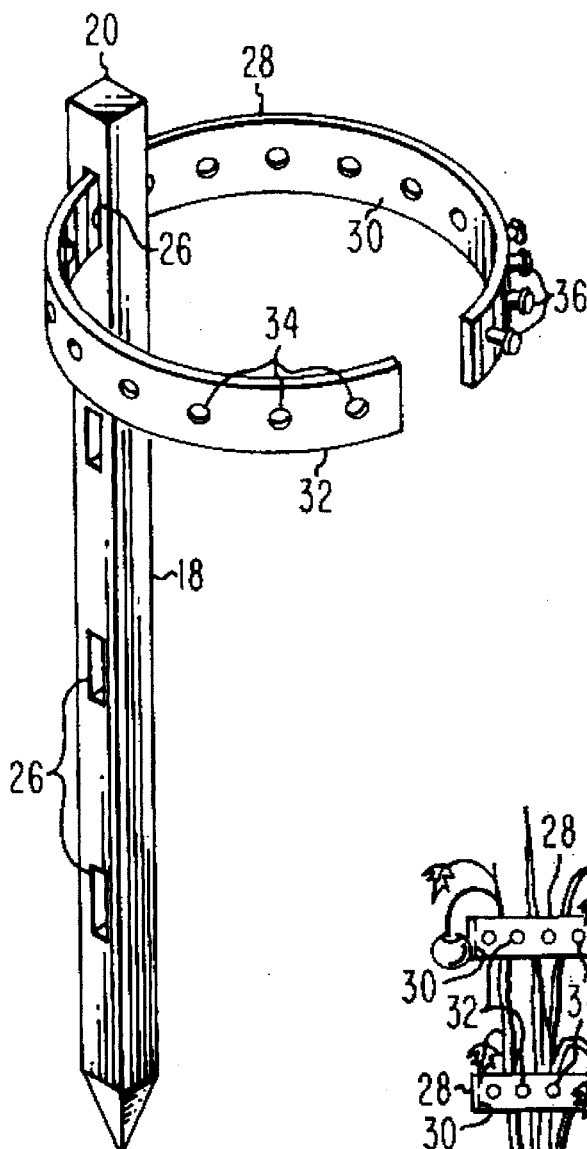
FIG. 3 is a side plan view of a single stake and a single supporting strap of an embodiment of the present invention showing the looped shape of the strap with studs extending outwardly therefrom.
Figure 2:
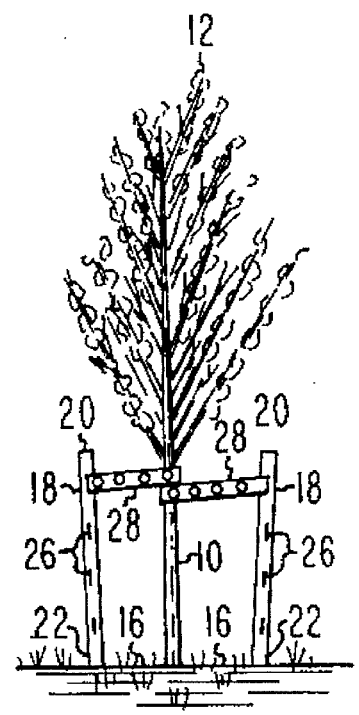
FIG. 2 is a side plan view of an embodiment of the apparatus of the present invention utilizing two stakes shown supporting a tree.
Figure 1:
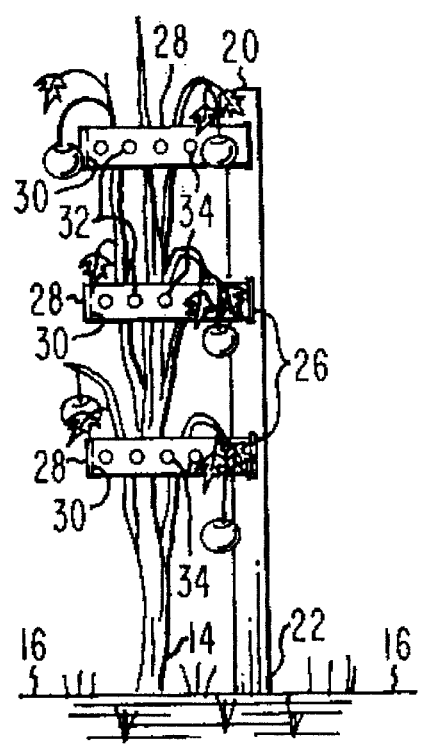
FIG. 1 is a side plan view of an embodiment of the apparatus of the present invention shown supporting a tomato plant.
Figure 4:
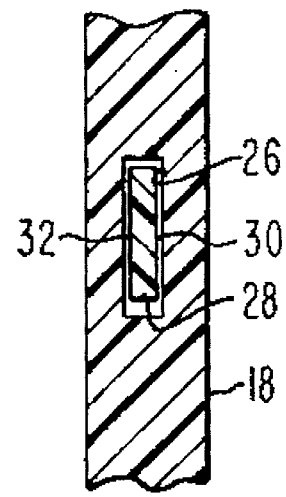
FIG. 4 is a side cross-sectional view of the supporting strap extending through a slot of a stake of an embodiment of the present invention shown with both having rectangular cross-sections.
Figure 5:
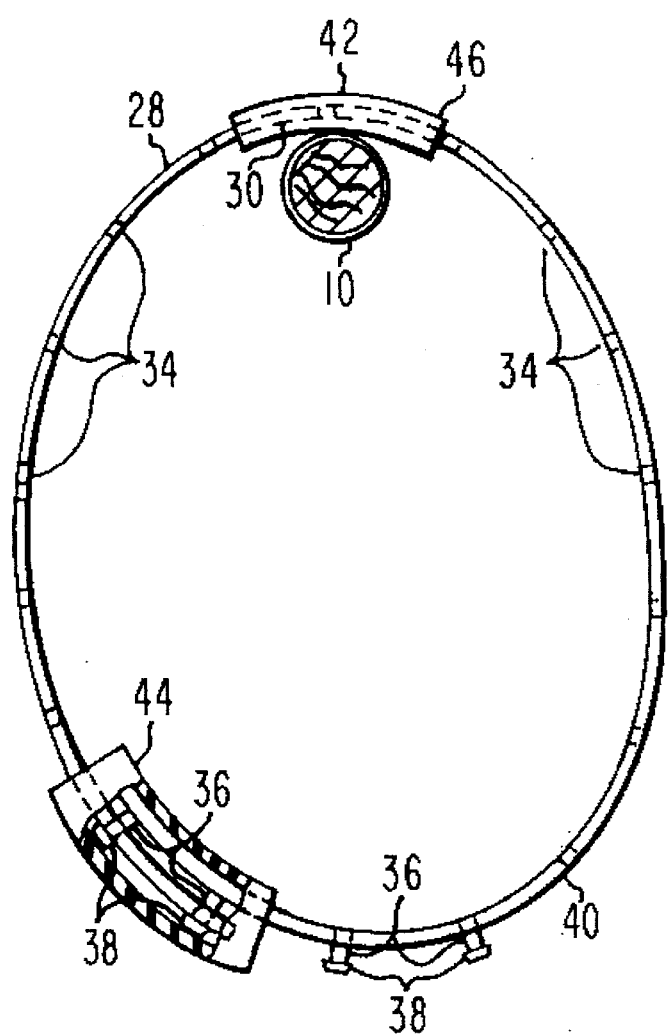
FIG. 5 is a top plan view of the circular loop-shaped configuration of a supporting strap in accordance with an embodiment of the apparatus of the present invention.

The present invention provides an apparatus for supporting plantlife 10 such as trees 12 or plants 14 growing in a ground area 16 or any other similar construction. The apparatus preferably includes a stake 18 which has a top end 20 and a lower insertion end 22. The insertion end 22 preferably includes an insertion point 24 to facilitate placement of the stake 18 into the ground area 16. Normally this placement will be achieved by hammering on the top 20 of the stake 18 to drive the stake 18 into the ground area 16 in a position adjacent to the plantlife 10.

The stake 18 will preferably define several slots 26 therein. Normally in a configuration of the present invention three or four such slots 26 are defined. Slots 26 will extend completely through the stake 18 and will preferably be of a rectangular cross section longitudinally oriented with respect to the length of the stake 18.

A supporting strap 28 will be adapted to extend through the slot 26 and in surrounding engagement with respect to the plantlife 10. Supporting strap 28 will preferably include a first flat surface area 30 thereof which extends generally vertically and is adapted to abut the plantlife 10 to facilitate support thereof while minimizing the possibility of damage to the plantlife 10. The supporting strap 28 will preferably have a generally rectangular cross section and, as such, will include a second flat surface area 32 oppositely positioned thereon from the first flat surface area 30 in order to define a vertically extending rectangular cross section. This rectangular cross section will be slightly smaller than the rectangular cross section of the slot 26 in order to facilitate insertion of the supporting strap 28 through the slot 26 while at the same time maintaining the first flat surface area 30 of the supporting strap 28 in the vertically extending orientation to enhance supporting and to minimize possible damaging of the plantlife 10 supported thereby.

The supporting strap 28 will be of a given length and will preferably include a plurality of apertures 34 therealong. The supporting strap 28 will also preferably include one or more studs 36 extending outwardly therefrom. Each of these studs is adapted to be capable of detachable engagement with respect to the apertures 34 in order to form a circular loop shape 40 for the supporting strap 28 as it extends through the slot 26 and around the plantlife 10 to facilitate support thereof. Each of these studs 36 preferably will include an enlarged head 38 to facilitate the detachable securement thereof extending through the apertures 34 defined in the supporting strap 28. In this manner the supporting strap 28 can have the total circumference of the formed circular loop 40 thereof varied in accordance with the size of the plantlife 10 supported thereby or responsive to the distance between the position of the stake 18 mounted in the ground area 16 and the portion of the shrub or plantlife 10 which is desired to be supported. In any case the length of the supporting strap 28 can be varied by choosing different studs 36 to be detachably securable with respect to different apertures 34 positioned at various locations along the supporting strap 28.

To further enhance use of the present invention a tubular locking device 42 may be positioned extending about the supporting strap 28. Preferably tubular locking device 42 is movable longitudinally along the circular loop shape 40 of the supporting strap 28. The tubular locking device 42 is adapted to be moved to a locking position 44 where it extends around the detachably engaged studs 36 and apertures 34 to enhance locking engagement therebetween and to affix and retain the supporting strap 28 in the circular loop shape 40. On the other hand the tubular locking device 42 can be moved to a plantlife engaging position 46 where it surrounds the supporting strap 28 in the area thereof where the first flat surface area 30 thereof engages the plantlife 10 which it is currently supporting. In this manner the tubular locking device 42 in the plantlife engaging position 46 will further prevent any damaging of the plantlife 10 supported by the supporting strap 28.

In this manner the apparatus of the present invention is particularly useful for year in and year out support of various different types of plantlife 10. The device of the present invention can be useful for supporting trees or tomato plants or other shrubbery as shown in the figures herein. Also the apparatus can be used with one or more of the slots 26 of the stake 18 utilized having a supporting strap 28 extending therethrough. In certain configurations such as trees, it is normally only necessary for each stake 18 to include a single supporting strap 28. On the other hand, when utilizing tomato plants or other shrubbery which requires more support, each stake 18 can include as many as three or four supporting straps 28 extending through the slots 26 defined therein.

In the preferred form of the present invention the stakes 18 will be of a rectangular cross section one, one and a quarter or one and a half inches in dimension on each side. The length of these stakes will preferably be four and half or five and a half feet with the longer dimension used primary for trees and larger bushes and the shorter dimension used for small trees or small shrubbery. Most of the stakes will include three or four slots 26 extending therethrough.

The parts of the present invention will preferably be formed of hard recycled plastic. Most importantly the stakes 18 will be formed of hard recycled plastic which will allow repeated use thereof for multiple applications since the plastic does not deteriorate and is not subject to rust or other types of deterioration such as metal or wooden stakes which have been commonly used heretofore. The hard plastic material is also preferably used for the supporting strap 28. Particularly the studs 36 will be formed of a hard plastic which can flex somewhat such that the enlarged head 38 thereof will compress or will expand the apertures 34 during detachable engagement therebetween. In this manner the enlarged head 38 will allow the studs 36 to be snapped into locking engagement with respect to the aperture or to snap out of locking engagement therewith.

one of the important aspects of the present invention is to maintain the first flat surface area 34 of the supporting strap 28 in the vertically extending position wherein the flat surface area is perpendicular to the ground area 16 and thus parallel to the upwardly growing trunk, shaft or foliage of the plantlife 10. In this manner more full and complete support is provided by the apparatus of the present invention while at the same time damage to the bark or foliage of the plantlife 10 is prevented. The maintaining of the vertical orientation of the first flat surface area 30 is achieved by the combination of the generally rectangular cross section of the supporting strap 28 used in combination with the slightly larger generally rectangular cross section of the slots 26. Since the slots are rectangular in cross section extending vertically, they tend to hold the supporting strap 28 in the vertically oriented position with the first flat surface area 30 thereof perpendicular to the ground area 16. As can be seen from the figures of the present invention, there will be some variation in this perpendicular relationship. However, generally speaking, the first flat surface area 30 will be approximately perpendicular to the ground area. In several of the figures it can be seen that the stakes 18 are not in a perfectly horizontal orientation but it is easy to see that the shape and orientation of the slot 26 is particularly important in attempting to maintain the supporting strap 28 in orientation such that the first flat surface area 30 thereof extends parallel to the upwardly growing plantlife 10 and in this manner achieves full support thereof while minimizing damage.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An apparatus for supporting plantlife growing in a ground area comprising:

A. a stake means including an insertion end secured extending into a ground area adjacent to a plantlife to position said stake means extending upwardly out of a ground area thereadjacent, said stake means defining at least one slot means extending generally laterally therethrough;

B. a supporting strap means including a flat surface area being adapted to abut adjacent plantlife for supporting thereof, said supporting strap means further defining a plurality of aperture means extending therethrough, said supporting strap means extending through said slot means defined in said stake means for securing of plantlife with respect thereto, said supporting strap means further including a plurality of stud means extending outwardly therefrom, at least one of said stud means being detachably engageable extending through at least one of said aperture means to affix said supporting strap means into a circular loop shape in surrounding supporting engagement with respect to adjacent plantlife for supporting thereof and extending through one of said slot means defined in said stake means; and C. a tubular locking means extending around said supporting strap means and being slidably movable therealong, said tubular locking means being movable to a locking position in surrounding engagement with respect to said stud means in engagement with one of said aperture means to facilitate detachably securement therebetween.

2. An apparatus for supporting plantlife growing in a ground area as defined in claim 1 wherein said insertion end includes an insertion point means to facilitate positioning thereof extending into ground area surrounding plantlife.

3. An apparatus for supporting plantlife growing in a ground area as defined in claim 1 wherein said slot means includes a plurality of slot members spatially disposed vertically with respect to one another along said stake means.

4. An apparatus for supporting plantlife growing in a ground area as defined in claim 1 wherein said stake means includes a top end positioned oppositely from said insertion end thereof and wherein said slot means are positioned adjacent to said top end thereof.

5. An apparatus for supporting plantlife growing in a ground area as defined in claim 1 wherein each of said slot means are rectangular in cross-section and extend perpendicularly with respect to said stake means.

6. An apparatus for supporting plantlife growing in a ground area as defined in claim 1 wherein said supporting strap means and said stake means are made of hard plastic.

7. An apparatus for supporting plantlife growing in a ground area as defined in claim 1 wherein said supporting strap means and said stake means are made of recycled hard plastic.

8. An apparatus for supporting plantlife growing in a ground area as defined in claim 1 wherein said flat surface area of said supporting strap means is oriented perpendicularly with respect to the ground area to minimize damaging of plantlife abutting thereagainst for support.

9. An apparatus for supporting plantlife growing in a ground area as defined in claim 1 wherein each of said stud means include enlarged heads thereon to facilitate detachable securement of said stud means with respect to said aperture means.

10. An apparatus for supporting plantlife growing in a ground area as defined in claim 1 wherein said supporting strap means includes a first flat surface area and a second flat surface area oppositely positioned thereon and generally parallel with respect to one another to define an elongated generally rectangular cross-sectional shape of said supporting strap means.

11. An apparatus for supporting plantlife growing in a ground area as defined in claim 1 wherein said tubular locking means is also movable to a plantlife engaging position surrounding said supporting strap means in the area thereof in abutment with respect to the supported plantlife to further minimize damaging thereof.

12. An apparatus for supporting-plantlife growing in a ground area as defined in claim 1 wherein said aperture means and said stud means are circular in cross-section.

13. An apparatus for supporting plantlife growing in a ground area as defined in claim 1 wherein said supporting strap means extends horizontally outwardly from said stake means toward said plantlife to facilitate supporting engagement therewith.

14. An apparatus for supporting plantlife growing in a ground area as defined in claim 1 wherein said stake means is approximately four to six feet in height.

15. An apparatus for supporting plantlife growing in a ground area as defined in claim 1 wherein slot means includes three separate slot members defined in said stake means and extending horizontally therethrough.

16. An apparatus for supporting plantlife growing in a ground area as defined in claim 1 wherein slot means includes four separate slot members defined in said stake means and extending horizontally therethrough.

17. An apparatus for supporting plantlife growing in a ground area as defined in claim 1 wherein said tubular locking means is made from hard recycled plastic.

18. An apparatus for supporting plantlife growing in a ground area as defined in claim 1 wherein said stake means has a square cross-sectional shape with sides of approximately one to one and one-half inches in length.

19. An apparatus for supporting plantlife growing in a ground area as defined in claim 1 wherein said support strap means is approximately three feet in length.

20. An apparatus for supporting plantlife growing in a ground area comprising:

A. a stake means including a top means and an insertion end thereon spatially disposed with respect to one another, said stake means being approximately four to six feet in length, said stake means being made of hard-recycled plastic, said insertion end including an insertion point means secured extending into a ground area adjacent to a plantlife to position said stake means extending upwardly out of a ground area thereadjacent, said stake means defining a slot means extending generally laterally therethrough, said slot means including at least three and less than five slot members defined therein;

B. a supporting strap means including a first flat surface area being adapted to abut adjacent plantlife for supporting thereof, said supporting strap means further including a second flat surface area oppositely positioned thereon from said first flat surface, said first flat surface area of said supporting strap means being oriented perpendicularly with respect to the ground area to minimize damaging of plantlife abutting thereagainst for support, said supporting strap means being made of hard recycled plastic, said supporting strap means further defining a plurality of aperture means extending therethrough, said supporting strap means extending through said slot means defined in said stake means for securing of plantlife with respect thereto, said supporting strap means further including a plurality of stud means thereon and extending outwardly therefrom, at least one of said stud means being detachably engageable extending through at least one of said aperture means to affix said supporting strap means into a circular loop shape in surrounding supporting engagement with respect to adjacent plantlife for supporting thereof and extending through one of said slot means defined in said stake means, each of said stud means include an enlarged head thereon to facilitate detachable securement of each of said stud means with respect to said aperture means.; and C. a tubular locking means made of hard recycled plastic and extending around said supporting strap means and being slidably movable therealong, said tubular locking means being movable to a locking position in surrounding engagement with respect to said stud means in engagement with one of said aperture means to facilitate detachably securement therebetween, said tubular locking means also being movable to a plantlife engaging position surrounding said supporting strap means in the area thereof in abutment with respect to the supported plantlife to further minimize damaging thereof.

\* \* \* \* \*